United States Patent Office 3,842,158
Patented Oct. 15, 1974

---

3,842,158
EXHAUST GAS CONVERSION PROCESS AND CATALYST
Rowland C. Hansford, Yorba Linda, Calif., assignor to Union Oil Company of California, Los Angeles, Calif.
No Drawing. Filed Apr. 20, 1972, Ser. No. 245,741
Int. Cl. B01d 53/00
U.S. Cl. 423—213.5    3 Claims

ABSTRACT OF THE DISCLOSURE

Process and catalyst for the catalytic conversion of nitrogen oxides, unburned hydrocarbons and carbon monoxide in internal combustion engine exhaust gases. The catalyst comprises essentially a composite of copper oxide and cobalt oxide wherein the weight ratio of $CuO/Co_2O_3$ is between about 1/8 and 2/1. A particularly unique feature of the catalyst is that it gives an unusually selective conversion of nitrogen oxides to elemental nitrogen instead of to ammonia.

BACKGROUND AND SUMMARY OF INVENTION

Much effort has been devoted in recent years to the development of thermal and catalytic converters for removing air pollutants such as hydrocarbons, carbon monoxide and nitrogen oxides from engine exhaust gases. In the catalytic field, a general approach has been to provide a two-stage conversion system (as illustrated for example in U.S. Patent 3,544,264), involving an initial contacting zone in which the raw exhaust gases are passed under reducing conditions over a suitable catalyst in the absence of added air, followed by a second zone in which oxidation of remaining CO and hydrocarbons is effected by adding to the first stage off-gases at least a stoichiometric proportion of air. Exemplary reactions which are believed to occur at least to some extent in the first conversion stage are as follows:

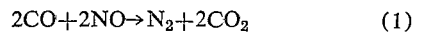

$$2CO + 2NO \rightarrow N_2 + 2CO_2 \quad (1)$$

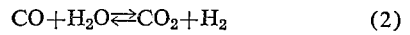

$$CO + H_2O \rightleftharpoons CO_2 + H_2 \quad (2)$$

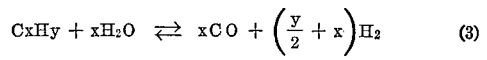

$$C_xH_y + xH_2O \rightleftharpoons xCO + \left(\frac{y}{2} + x\right)H_2 \quad (3)$$

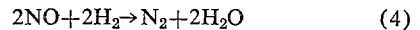

$$2NO + 2H_2 \rightarrow N_2 + 2H_2O \quad (4)$$

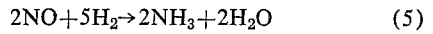

$$2NO + 5H_2 \rightarrow 2NH_3 + 2H_2O \quad (5)$$

These reactions occur under what may be designated "net reducing" conditions, i.e., conditions wherein the mole ratio of oxygen to carbon monoxide and hydrocarbons is less than stoichiometric. Reactions 2 and 3 seldom go to completion, so that the off gases from the first stage nearly always comprise at least an equilibrium proportion of carbon monoxide and hydrocarbons. It is hence necessary to provide a second oxidation stage with added air in order to complete the oxidation of carbon monoxide and hydrocarbons. By proper selection of catalysts, reactions 1, 4 and 5 above generally provide for conversion of 90 percent or more of the nitrogen oxides. A complicating factor however is the relative extent to which reaction 5 takes place versus reactions 1 and 4. Most of the catalysts heretofore utilized tend to favor reaction 5, so that the first stage off-gases contain at least about one-half mole of ammonia per mole of nitric oxide converted. This ammonia is then oxidized in the oxidation stage back to nitric oxide which then is emitted to the atmosphere as a pollutant. It hence would be highly desirable to provide a first-stage catalyst which can selectively convert nitrogen oxides to elemental nitrogen rather than to ammonia. The catalysts of this invention are found to exhibit a high degree of this desired selectivity.

U.S. Pat. No. 3,398,101 to Baker et al. discloses a prereduced composite copper oxide-cobalt oxide catalyst wherein the weight ratio of $CuO/Co_2O_3$ is between about 3/1 and 35/1. This catalyst is said to be highly active for the conversion of nitrogen oxides, and a reaction mechanism is proposed which appears to suggest that the NO is converted to nitrogen rather than ammonia. Repeated tests have failed to confirm this hypothesis. The Baker et al. catalysts, while highly active for overall conversion of nitrogen oxides, have been found to be relatively non-selective, in that about 40–60% of the nitrogen oxides converted are converted to ammonia. Due apparently to their higher cobalt content and/or higher ratio of cobalt to copper, the catalysts of this invention normally give about 80–95% selectivity of conversion to elemental nitrogen.

In addition to their desired selectivity, the present catalysts are found to bring about a substantial oxidation of the carbon monoxide and hydrocarbons in the raw exhaust gas, presumably through the mechanisms of equations 2 and 3 above. This is very surprising, considering that net reducing conditions prevail. Notwithstanding this factor, it is found that the unburned hydrocarbons are substantially completely oxidized, and normally at least about 50 percent of the carbon monoxide is oxidized. Having achieved a selective and substantially complete conversion of nitrogen oxides to nitrogen, a substantially complete oxidation of unburned hydrocarbons, and a substantial conversion of carbon monoxide, it will be apparent that the need for a second oxidation stage is materially reduced, or in many cases eliminated. In cases where complete conversion of carbon monoxide is not required, the catalysts of this invention may be utilized in a single stage converter, and if higher conversion levels are required, a two-stage system may be utilized in which the second stage is materially reduced in size.

The catalysts of this invention are also advantageous in avoiding excessive heat evolution, thus eliminating the need of air pumps or expensive heat resistant materials of construction. The use of air in conventional two-stage systems to oxidize hydrocarbons and carbon monoxide often results in overheating of the second stage, depending upon air/fuel ratios to the engine and resultant hydrocarbon and oxygen content of the raw exhaust gases. In my conversion system, air injection is either materially reduced or eliminated, thus reducing the overall exothermicity of the conversion. Under the normal range of engine operating conditions (principally air/fuel ratios), the net thermal effect of reactions 1 through 5 above is exothermic but under any given set of operating conditions, the concurrence of endothermic reactions 2 and 3 with exothermic reactions 1, 4 and 5 substantially reduces the overall heating effect. It will be apparent also that in cases where a second stage is utilized, the oxidation load therein is reduced, thus reducing the heat output in that stage also.

In broad aspect, the catalysts of this invention are intimately admixed composites of cobalt oxide and copper oxide, which composites contain (by weight) at least about 1% CuO, and at least about 4% $Co_2O_3$, and wherein the weight ratio of $CuO/Co_2O_3$ is between about 1/8 and 2/1. The preferred composites contain at least about 2% CuO and at least about 6% $Co_2O_3$, and the preferred $CuO/Co_2O_3$ ratio is between about 1/6 and 1/1. The precise function of each of the catalyst components is not known with certainty, but since copper oxide alone is quite active for nitric oxide conversion but selectively converts it to ammonia, it would appear that the cobalt component contributes the desired selectivity characteristic, perhaps by catalyzing the dissociation of ammonia into elemental nitrogen and hydrogen. And since neither component alone is particularly active under reducing conditions for converting hydrocarbons and carbon monoxide, it would appear that the combination, perhaps in the spinel form $CuCo_2O_4$, is required to achieve significant activity in this area. The calcination temperature also appears to be a significant factor; composites calcined at high temperatures of e.g., 1800° F. are found to be considerably less active for $NO_x$ conversion, and less selective for conversion to elemental nitrogen, than composites calcined at lower temperatures.

DETAILED DESCRIPTION

The catalysts of this invention may be prepared by several different methods, in supported or unsupported form, and may take a variety of shapes, forms and sizes. Unsupported catalysts may be prepared for example by coprecipitating the hydroxides or carbonates of copper and cobalt from an aqueous solution of mixed salts of the two metals, using for example sodium hydroxide or sodium carbonate to effect coprecipitation. The coprecipitate is then filtered off, washed thoroughly to remove sodium ions, and may then be formed into suitable pellets, prills, tablets or extrudates by conventional methods, preferably with the aid of a suitable binder, e.g., 5–20 weight-percent of a gelatinous, acid-peptized alumina. Other conventional binders such as clays and the like may also be utilized. The granular composites so obtained are then dried and optionally calcined as will be subsequently described.

The coprecipitation technique however is not essential. Fully equivalent results have been obtained by mixing the powdered metal oxides, mulling with peptized alumina or other suitable binder, extruding, drying and calcining. Other compounds, such as the metal carbonates, oxalates, nitrates, acetates, or similar salts whose anions can be readily decomposed during calcination, can also be used in preparing the catalyst by the co-mulling technique.

While highly active catalysts can be prepared by the above techniques, the resulting essentially undiluted composites generally have an undesirably high density. Low density composites of substantially equal activity may be prepared for example by grinding the comulled or coprecipitated metal compounds to micron or sub-micron size and then coextruding or copelleting the mixtures with relatively large amounts of alumina or other inert matrices such as clay, silica gel, silica-alumina, and the like. Precalcined composites of cobalt oxide and copper oxide may similarly be powdered and coextruded or copelleted with such inert matrices. By either of these methods, the final composites is again dried and, if desired, calcined.

Suitable low density catalysts may also be prepared by conventional impregnation methods wherein a porous, inert support such as Carborundum, alpha alumina, delta alumina, mullite, aluminum phosphate or the like, in suitable granular or monolithic form, is impregnated either sequentially or simultaneously with an aqueous solution or solutions of the nitrates or other soluble and heat-decomposable compounds of copper and cobalt, followed by draining, drying and calcining of the impregnated support. The metal content of the impregnated catalysts may range between about 1 and 20 percent, preferably 2–10 percent of copper as CuO, and between about 4 and 30 percent, preferably 6–20 percent of cobalt as $Co_2O_3$. Both in the supported and unsupported catalyst compositions, the weight ratio of Cu/Co, calculated as CuO and $Co_2O_3$, is between about 1/8 and 2/1, preferably between about 1/6 and 1/1. It is found that a weight excess of $Co_2O_3$ equivalent over the CuO equivalent is desirable to achieve maximum selectivity of conversion of NO to $N_2$ rather than $NH_3$. Although the metal contents and ratios have been expressed herein in terms of oxides, it is not to be concluded that those oxide forms are the active species in the final catalyst. It would appear in fact that the lower valent oxides, $Cu_2O$ and CoO, or even the respective free metals may be the active species.

The dried catalyst composites, prepared by any of the above methods, may be utilized directly for exhaust gas conversion. The normal conversion temperatures of about 900–1400° F. are sufficient to activate the catalysts in situ by thermal and/or reductive conversion of the metal salts to the active oxides and/or free metals. Preferably however the catalysts are precalcined in air at relatively low temperatures of about 700°–1500° F. for about 1–8 hours; higher temperatures are to be avoided since they tend to bring about some loss in activity. Following the calcination, the catalysts may if desired be subjected to reduction with hydrogen or carbon monoxide at e.g., 700–1000° F., although this procedure normally offers no real advantage over placing the calcined catalyst directly on-stream for in-situ reduction by the exhaust gases.

The following examples are cited to illustrate the invention, but are not to be construed as limiting in scope:

EXAMPLES 1–14

A series of 14 supported copper-cobalt catalysts was prepared as follows:

The support, Kaiser SAS alumina prills, was first precalcined for 24 hours at 1800° F., and portions thereof were then soaked for 30 minutes in one of 14 different copper nitrate-cobalt nitrate solutions, air dried on a Buchner funnel for one hour and then oven dried for one hour at 110° C. The nitrate impregnating solutions were formulated to give various Cu/Co ratios for each of three different CuO loadings, viz, 8%, 4% and 2% by weight. The oven dried catalysts were then tested without further calcination for NO conversion activity and selectivity.

In each of the test runs, the feed gas composition was as follows:

| | Mole Percent |
|---|---|
| CO | 1.0 |
| $H_2$ | 0.33 |
| $C_3H_6$ | 0.10 |
| NO | 0.08 |
| $H_2O$ | 10.0 |
| Air ($O_2$) | 1.43 (0.3) |
| $CO_2$ | 13.0 |
| $N_2$ | 74.06 |
| | 100.0 |

The test procedure consisted in passing the feed gas through the catalyst bed at a gaseous hourly space velocity of 23,000, measuring NO conversion at about 1000° F. (which generally gives 100% conversion), then at successively lower temperatures so as to bracket the 50% conversion temperature and obtain temperature coefficients. From this the 50% and 95% conversion temperatures were calculated, based on the first-order rate equation. Selectivity of conversion to nitrogen was determined at 1250° F. ("Selectivity" is the percent of NO converted which was converted to $N_2$.) The results were as follows:

TABLE 1

| Catalyst | Weight percent | | Conversion of NO | | Selectivity to $N_2$, percent (at 1,250° F.) |
|---|---|---|---|---|---|
| | CuO | $Co_2O_3$ | Temp., °F. for— | | |
| | | | 50% conv. | 95% conv. | |
| A | 8 | 24 | 599 | 751 | 86 |
| B | 8 | 16 | 563 | 663 | 89 |
| C | 8 | 8 | 598 | 756 | 82 |
| D | 8 | 3 | 615 | 779 | 72 |
| E | 4 | 12 | 579 | 697 | 86 |
| F | 4 | 8 | 608 | 770 | 83 |
| G | 4 | 4 | 628 | 768 | 69 |
| H | 4 | 1 | 648 | 773 | 54 |
| I | 2 | 20 | 1,038 | 1,313 | 47 |
| J | 2 | 12 | 638 | 753 | 85 |
| K | 2 | 6 | 662 | 793 | 74 |
| L | 2 | 4 | 638 | 742 | 66 |
| M | 2 | 2 | 658 | 775 | 56 |
| N | 2 | 0.67 | 663 | 780 | 51 |

Catalysts A, B, C, E, F and J are well within the preferred composition ranges of the invention, and it will be noted that they all gave over 80% selectivity of conversion to $N_2$, and showed good overall activity. Catalysts G and L are within the non-preferred ranges of the invention; their minimal cobalt content of 4% resulted in lower selectivities of 69% and 66%, respectively. Excluded catalyst D, containing only 3% $Co_2O_3$, appears somewhat superior, but the differences in activity and selectivity between catalysts D and G are probably within experimental error. Catalysts H and N have $CuO/Co_2O_3$ ratios falling within the range of the above noted Baker et al. patent, and it will be noted that their selectivities were only 54% and 51% respectively. The data for catalyst I demonstrates that both activity and selectivity are markedly depressed when the ratio of $CuO/Co_2O_3$ falls below the 1/8 limit required herein. Catalyst M is excluded herein because it is evident that 2% $Co_2O_3$ is insufficient to give the desired selectivity.

At 1000° F., catalysts A, B, C, E, F, G, J, K and L all gave essentially quantitative conversion of the propylene in the feed gas, and about 45–55% conversion of the CO.

EXAMPLES 15–18

Four unsupported catalysts of the present invention were prepared by coprecipitation of $Cu(OH)_2$ and $Co(OH)_2$ with sodium hydroxide from a solution of the nitrate salts. The coprecipitation was carried out by metering a stream of the salt solution and a stream of NaOH solution into the inlet of a centrifugal pump. By this means a very rapid mixing of the solutions at a constant pH of about 7.5 was readily accomplished. The gelatinous precipitate was filtered, dried at 220° F., and washed free of sodium (0.01%) by a stream of deionized water flowing upward through the granular solid. The washed product was dried and pulverized through a 100-mesh screen. The powder was then thoroughly mulled with enough gelatinous acid-peptized alumina to give 10 percent by weight of alumina to the final product. The mulled mix was extruded through a 1/16" die, dried, and calcined for 3 hours at 700°, 1100°, 1400° and 1800° F. (separate portions). The finished catalysts contained about 10% $Al_2O_3$, 45% CuO and 45% $Co_2O_3$ by weight.

The four catalysts were then activity tested as described in Examples 1–14, with the following results:

| Catalyst | Calcination temp., °F. | Conversion of NO Temp., °F. for— 50% conv. | 95% conv. | Selectivity to $N_2$, percent (at 1,250° F.) |
|---|---|---|---|---|
| O | 700 | 463 | 545 | 93 |
| P | 1,100 | 468 | 518 | 93 |
| Q | 1,400 | 515 | 522 | 92 |
| R | 1,800 | 723 | 1,167 | 97 |

It will be seen that all four of these catalysts had excellent selectivity, but that the catalyst calcined at 1800° F. was markedly less active than the other three. Evidently, high temperature calcination brings about some undesirable interaction between the metal oxides.

The following claims and their obvious equivalents are intended to define the true scope of the invention:

1. A method for converting nitrogen oxides in engine exhaust gases selectively to elemental nitrogen, which comprises passing said exhaust gases at elevated conversion temperatures and under net reducing conditions through a catalyst composite in which the active components are essentially cobalt oxide and copper oxide in intimate admixture, or reduced forms thereof, the copper content of said catalyst being at least about 2% by weight as CuO, the cobalt content being at least about 6% by weight as $Co_2O_3$, and wherein the equivalent weight ratio of $CuO/Co_2O_3$ is between about 1/6 and 1/1.

2. A method as defined in claim 1 wherein said catalyst contains about 2–20% copper as CuO and about 6–30% cobalt as $Co_2O_3$, supported on a porous, inert refractory oxide carrier.

3. A method as defined in claim 1 wherein said catalyst contains about 2–10% copper as CuO and about 6–20% cobalt as $Co_2O_3$, supported on a porous inert refractory oxide carrier.

References Cited

UNITED STATES PATENTS

| | | | |
|---|---|---|---|
| 3,737,396 | 6/1973 | Negra et al. | 423—213 X |
| 3,447,893 | 6/1969 | Stephens et al. | 423—213 |
| 3,398,101 | 8/1968 | Baker et al. | 423—213 X |
| 3,257,163 | 6/1966 | Stiles | 423—213 |
| 2,924,504 | 2/1960 | Reitmeier | 423—239 |

GEORGE O. PETERS, Primary Examiner

U.S. Cl. X.R.

423—239